United States Patent [19]
Duley et al.

[11] Patent Number: 5,548,764
[45] Date of Patent: Aug. 20, 1996

[54] POWER INTERRUPT DEVICE WITH REMOTE ACTIVITY DETECTOR

[75] Inventors: Raymond S. Duley, Buda; Ashfaq R. Khan, Austin, both of Tex.

[73] Assignee: Advanced Micro Devices, Inc., Sunnyvale, Calif.

[21] Appl. No.: 56,112

[22] Filed: Apr. 30, 1993

[51] Int. Cl.$^6$ .................................................. G06F 1/32
[52] U.S. Cl. ............................... 395/750; 364/DIG. 1; 364/273.1; 364/273.3
[58] Field of Search ................................. 395/750, 550; 364/707; 250/214 AL; 340/569, 500

[56] References Cited

U.S. PATENT DOCUMENTS

| | | | |
|---|---|---|---|
| 3,939,640 | 2/1976 | Kahn | 58/23 R |
| 4,193,055 | 3/1980 | Barnum | 367/94 |
| 4,198,563 | 4/1980 | Elssner | 250/214 AL |
| 4,346,427 | 8/1982 | Blissett et al. | 361/173 |
| 4,361,767 | 11/1982 | Pelka | 307/117 |
| 4,461,977 | 7/1984 | Pierpoint et al. | 315/159 |
| 4,585,339 | 4/1986 | Senoo | 355/69 |
| 4,701,946 | 10/1987 | Oliva et al. | 379/98 |
| 4,768,020 | 8/1988 | Chen | 340/567 |
| 4,873,469 | 10/1989 | Young et al. | 315/155 |
| 4,914,313 | 4/1990 | Clingon et al. | 307/10.1 |
| 4,993,049 | 2/1991 | Cupps | 377/6 |
| 5,083,266 | 1/1992 | Watanabe | 395/275 |
| 5,148,153 | 9/1992 | Haymond | 340/711 |
| 5,157,841 | 10/1992 | Dinsmore | 33/361 |
| 5,291,607 | 3/1994 | Ristic et al. | 395/750 |
| 5,295,064 | 3/1994 | Malec et al. | 364/401 |
| 5,299,117 | 3/1994 | Farnbach | 364/405 |
| 5,375,245 | 12/1994 | Solhjell et al. | 395/750 |

FOREIGN PATENT DOCUMENTS

| | | |
|---|---|---|
| WO93/07558 | 4/1993 | Canada . |
| WO82/03520 | 10/1982 | European Pat. Off. . |
| 0067502 | 12/1982 | European Pat. Off. . |
| 0265209 | 4/1988 | European Pat. Off. . |

*Primary Examiner*—Jack B. Harvey
*Assistant Examiner*—Ayaz R. Sheikh
*Attorney, Agent, or Firm*—Kevin L. Daffer

[57] ABSTRACT

A power interrupt device for detecting activity remote from the detector and/or device and for producing a signal capable of interrupting power to a load, such as an electronic display. The detector can sense remote activity, and the activity or associated object need not contact the detector. Depending upon whether the activity is present or not present, the detector and associated interrupt circuitry can turn on or off a power load device such as an electronic display. The power interrupt device is well suited for turning off an electronic display when a user is no longer in the room or working area. The computer can remain running, however, the associated display can be remotely turned off to reduce the amount of heat dissipated from the display during periods when the user is not present.

20 Claims, 4 Drawing Sheets

POWER INTERRUPT DEVICE WITH REMOTE ACTIVITY DETECTOR

BACKGROUND OF THE INVENTION

1. Field of the Invention

This invention relates to an electronic circuit and more particularly to a power interrupt circuit with remote activity detector for controlling power to a load device such as an electronic display.

2. Background of the Relevant Art

It is well known that an input/output device, such as an electronic display, is necessary for operation of programmable devices such as computers. An electronic display serves to depict information processed or stored within the computer. Each time the computer is turned on, the corresponding display must also be turned on in order to read or write information to the computer. The display is usually left on so long as the attached computer remains on. Even though the operator may not be presently using the computer, the display nonetheless remains on.

More recently, various screen saver programs have been devised for transmitting graphic information to the display from the computer. Screen saver programs often require a fully active central processing unit (CPU) in order to produce the graphically intense images presented across the screen. Screen saver programs function to turn off and on various pixels across the screen during times in which the computer is not being accessed. Toggling on and off various pixels thereby prevents one or more pixels from remaining constantly on. A pixel which remains on over a long period of time may cause permanent damage to the backing material (e.g., phosphor) associated with the screen. An image displayed over a long period of time may be permanently cast into the backing material causing what is often referred to as "screen memory."

Although screen saver programs help prevent damage to the screen by reducing screen memory, screen saver programs do nothing to alleviate unnecessary power consumption associated with the computer and attached display. In fact, screen saver programs purposefully maintain full performance of the CPU necessary to generate the graphical images. They also require a fully operational display necessary to present the image. The heat dissipation associated with active CPUs and associated displays can be fairly significant. Oftentimes, a business entity may employ numerous computers and associated displays within a work area. The computers and displays remain fully operational even though the employees are not presently using them. A large numbers of computers associated with many businesses remain on for extended periods of time contributing to a significant amount of heat dissipated into the working area.

The problems associated with heat dissipation normally present themselves in terms of the costs associated with cooling the work area. In work areas employing many computers and displays, it is necessary to maintain a fully operational air conditioning system. The system must cool the work area and expel the added heat being dissipated from the active displays even though the displays are not currently needed.

As used herein, "electronic display" represents any electronically controlled terminal or monitor for displaying graphic and/or alphanumeric symbols. Electronic display includes any active or passive display device. Active devices include displays utilizing the various light-emitting processes such as, for example, cathodoluminescence, photoluminescence, electroluminescence, plasma decay and blackbody radiation. Cathodoluminescence includes cathode ray tubes (CRTs), photoluminescence includes colored gas discharge devices and fluorescent lamps, and electroluminescent devices include light-emitting diodes (LEDs). Plasma decay and blackbody radiation techniques are typically used in gas discharge panels and tungsten filament projection devices, respectively. Passive displays include displays controlled by light-absorption or light-reflection processes. Passive displays include electromechanical, electrochromeric, electropolarization and electrophoretic display techniques. The most popular passive display, utilizing electropolarization, includes liquid crystal displays (LCDs).

SUMMARY OF THE INVENTION

The problems outlined above are in large part solved by the device of the present invention. That is, the power interrupt device hereof utilizes electronic circuitry necessary to detect activity or inactivity remote from the load (e.g., the electronic display). The present detector can sense various external conditions proximate to or somewhat distant from the computer area and, based upon those conditions, turn the electronic display off or on. Dissimilar from non-remote physical contact detectors (e.g., keyboard-entry, or keyboard and/or computer touch detectors), the remote condition detector hereof senses activities surrounding remote objects, wherein the remote objects need not physically contact the computer or associated peripheries. The detector hereof can detect any remote condition including motion (vibration), temperature, sound, light, etc. Any remote condition indicative of an operator being present in an area remote from the computer will present itself to the detector causing power interruption to the display. Once the display is off, it no longer consumes valuable electric power, and no longer dissipates heat. Therefore, a display which is deactivated at the proper moment presents a considerable savings in air condition or cooling costs.

The power interrupt circuitry and associated detector functions, therefore, as a smart, remote activity detector. The present invention can be obtained as a stand-alone device and can be retrofitted between the wall unit AC power supply and the display. The smart detector hereof does not merely turn off the display after a certain amount of time has elapsed subsequent to a non-remote condition (e.g., subsequent to the last keyboard entry). Instead, the smart detector senses remote objects, changes in object position, and/or sound, pressure or light waves emanating from the object. The object itself need not come in contact with the computer, the associated display, or the keyboard in order for its presence to be sensed. For example, there may be times during which the operator is present but chooses to read information from the display rather than input information to the keyboard. In such instances, it is important that the display remain active to allow the operator to continue reading the display while not requiring the operator to periodically strike a keyboard in order to ensure the display remains on. The smart detector thereby controls power to the display depending upon remote target conditions. Furthermore, the detector provides adjustable delaying circuitry for allowing the display to delay its turn off depending upon user requirements.

Broadly speaking, the present invention contemplates a power interrupt device comprising a detector capable of sensing an activity remote from the detector and for producing an electrical signal during times in which the activity ceases or is no longer present. A clocking circuit is connected to the detector and is adapted to produce a clocking output upon receiving the electrical signal. A counter circuit is connected to the clocking circuit and is adapted to produce a pulse after a number of transitions of the clocking output have occurred. A latching circuit is connected to the counter circuit for latching the pulse at a steady state until the electrical signal ceases or an active condition re-occurs. A conductive path is confined within a switch, wherein the path is capable of being disconnected during times in which the switch receives the pulse latched at a steady state.

The present invention further contemplates a power source and a power load, a suitable load being an electronic display. A detector can be retrofitted between the power source and power load, and can be fixed proximate to the load. The detector comprises a transducer capable of sensing varying activities remote from the detector and/or load. The detector can sense the presence of a remote object, changes in object position, and various propagating waves such as sound waves, pressure differential waves and light waves emanating from the object. The detector can therefore be an optical detector, a sound detector, a motion (vibration) detector and/or a pressure differential detector.

The present invention still further contemplates a clocking circuit capable of producing a clocking output signal at varying frequency. Frequency can be varied depending upon changes in magnitude of a variable resistor coupled within a resistor-capacitor network attached to the clocking circuit. Changes in resistance causes corresponding change in frequency or cycle time of the clocking output signal. An increase in the clocking output signal frequency will causes a corresponding decrease in the amount of time delay between which the detector sends the electrical signal and the time in which the switch opens the conductive path. Accordingly, in one embodiment of the present invention, the operator can manually or automatically program a change in the time delay after which the detector no longer senses a remote activity and prior to the time in which the switch is opened.

The present invention still further contemplates a power controller for an electronic display. The power controller comprises a power source and an electronic display having a power input. A power interrupt device is retrofitted between the power source and the power input. The power interrupt device will disconnect the power source to the electronic display during times in which an activity remote from the display no longer occurs. Thus, the power interrupt device can function as a power controller for the electronic display.

BRIEF DESCRIPTION OF THE DRAWINGS

Other objects and advantages of the invention will become apparent upon reading the following detailed description and upon reference to accompanying drawings in which.

Figure 1:
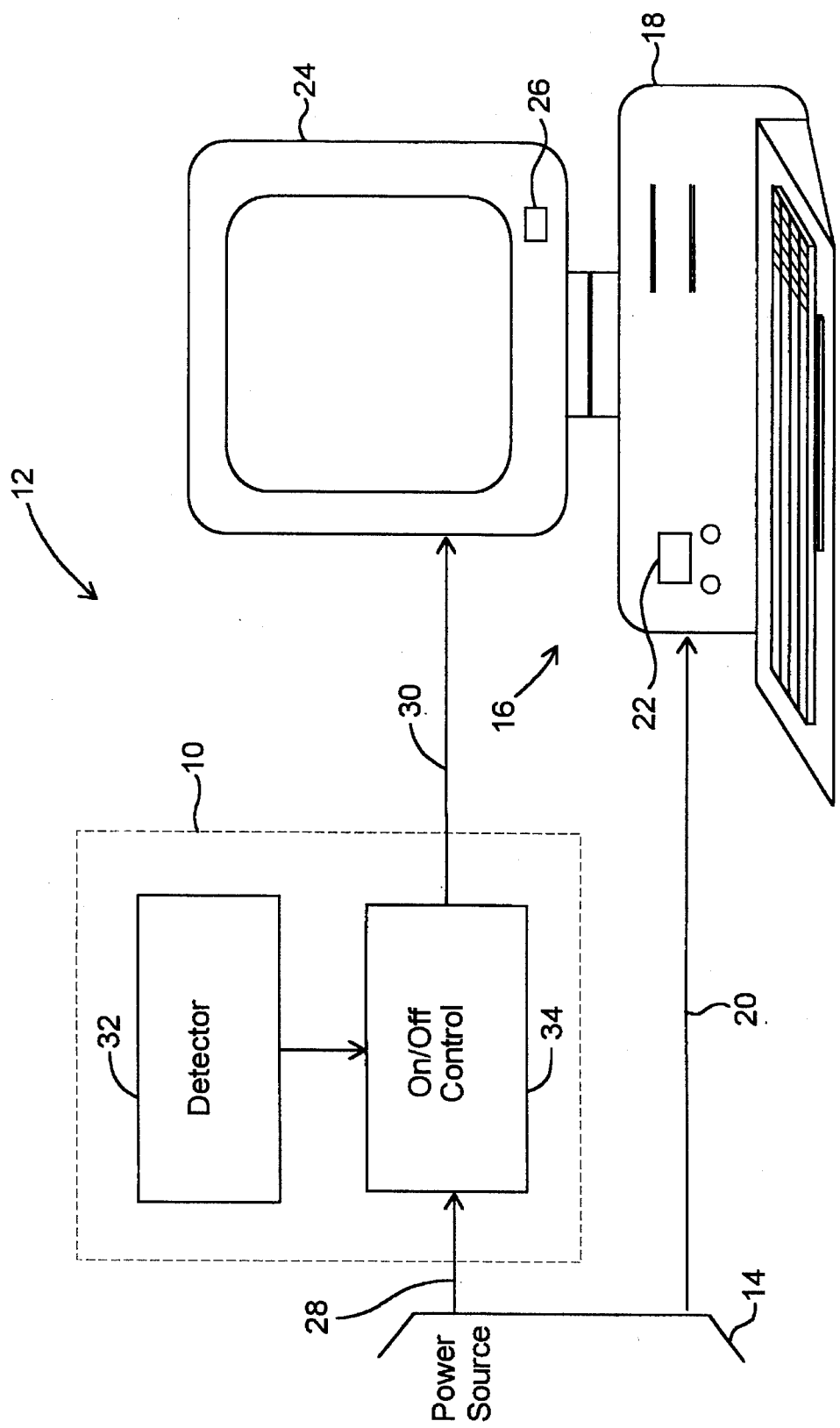
FIG. 1 is a power interrupt device according to the present invention shown in block diagram coupled between a power source and a power load such as an electronic display.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 illustrates a block diagram of a power interrupt device 10 coupled within a power distribution system 12. System 12 includes a power source 14 and a power load 16. A preferred power load 16 includes a computer and electronic display, a suitable computer being an XT/AT personal computer and its derivatives.

Power source 14 is coupled directly to the computer operating cabinet 18 as shown by conductive path 20. Cabinet 18, containing all necessary computer programmable hardware and associated software, can be activated by switch 22. Likewise, electronic display 24 can be activated by switch 26. Coupled between power source 14 and display 24 is power interrupt device 10. A suitable device 10 includes a cabinet having a power cord 28 capable of being plugged into either an AC or DC power source 14 and also having a receptacle capable of receiving a power cord 30 from display 24. Power cords 28 and 30 are well known and are illustrated with power flow signals for each cord. Power interrupt device 10 can therefore be retrofitted to any existing power load 16 which utilizes a power cord capable of being connected to a power source 14. Further, the power cord of load 16 can easily be unplugged from source 14 and readily plugged into the receptacle of device 10. Device 10 can therefore be easily retrofitted between load 16 and source 14 without any modifications to the existing system. Preferably, load 16 includes selectively and non-selectively activated loads such as, e.g., a computer having non-selectively activated power hardware 18 and selectively activated power display 24. As defined herein, selectively activated load are those loads which are capable of being connected or disconnected to the source such that the load is selectively turned off by the device irrespective of an on/off switch normally placed on the load.

An important advantage of device 10 is the ability to selectively deactivate specific load circuits such as an electronic monitor 24 during times in which detector 32 receives non-contact indicia of remote activity. Upon receiving any remote condition or external stimuli, including motion (vibration), temperature, sound, light, etc., detector 32 presents a signal to on/off control circuit 34. Control circuit 34 can selectively connect or disconnect the power conductive path 28 and 30 during times in which detector 32 presents the signal. Thus, a key element of detector 32 is its ability to detect not only physical contact between an object (such as a human) and the detector, but also to detect changes in object position and/or sound, pressure, or light waves emanating from the object or an associated object. For example, detector 32 can sense movement of an object such as a human within the area. Still further, detector 32 can sense any voice or sound, within a certain decibel level, emanating from an object or person within the working area. Depending upon whether or not a remote activity is present, detector 32 can send a corresponding signal to the on/off control circuit 34 necessary to disconnect or connect conductors 28 and 30. Various detecting methods necessary to determine the presence of motion, vibration, pressure differential, sound, light, and the transducers associated therewith will be described in detail hereinbelow.

Figure 2:
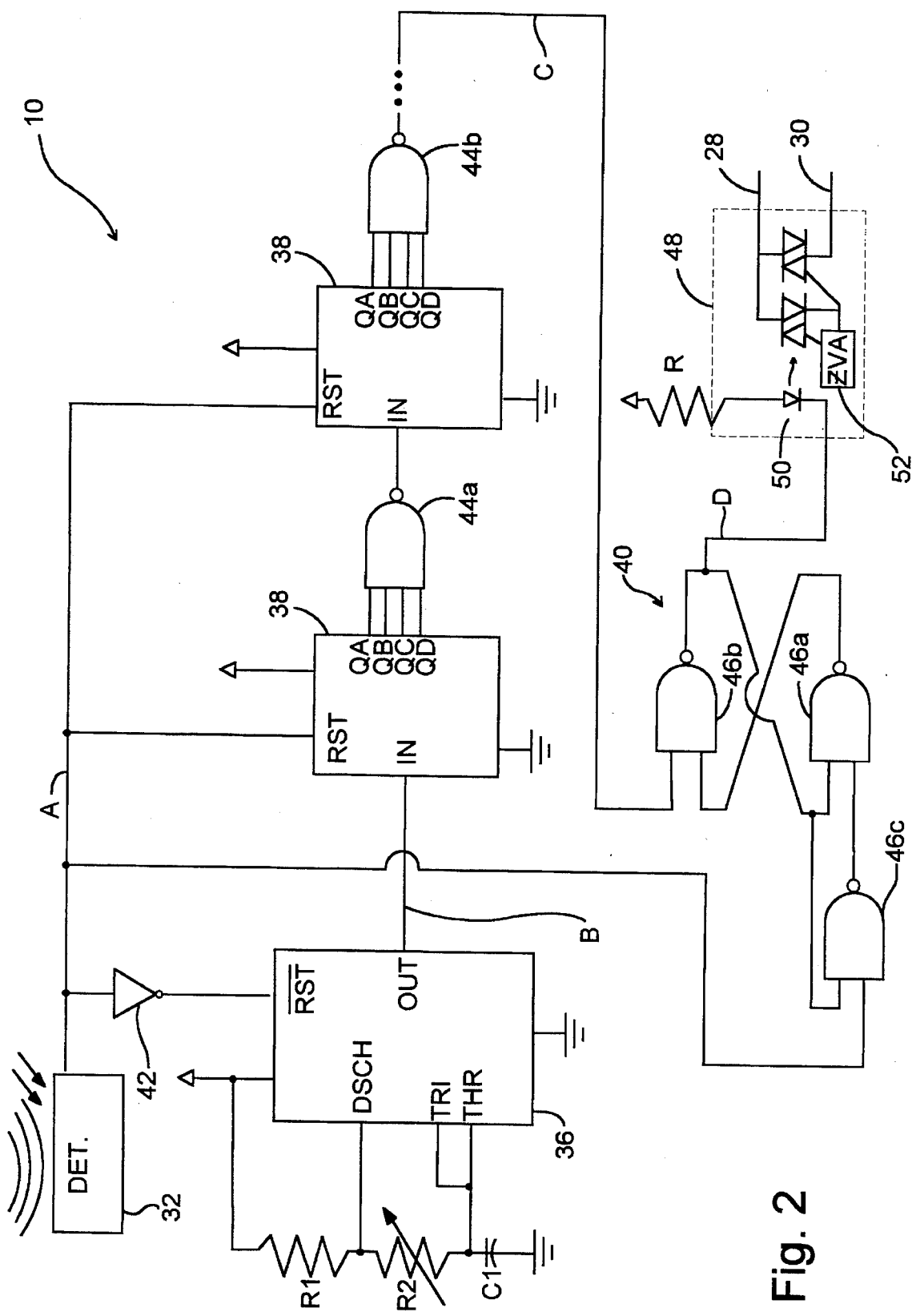
FIG. 2 is a circuit diagram of a power interrupt device according to the present invention.

Referring now to FIG. 2, detector 32 is shown in circuit diagram having an output connected an inverter/buffer 42, one input of two input nand gate 46c and reset (RST) input of series-connected counter circuits 38. A RST bar input of clocking circuit 36 is connected to the output of inverter 42. A suitable clocking circuit 36 includes one obtained from Texas Instruments, Inc., Dallas, Tex., part no. TLC555. Clocking circuit initiates a clocking output signal or series of clocking pulses from output (OUT) when the output of inverter 42 goes high. If the output of inverter 42 goes low, then clocking circuit 36 is reset and the clocking output signal ceases. The clocking pulses are at a high level during times in which trigger (TRI) and threshold (THR) inputs are at a relatively low voltage level (i.e., less than ⅓ VDD). Conversely, clocking pulses are at a low voltage level during times in which TRI and THR are at a relatively high voltage level (i.e., greater than ⅔ VDD). The frequency with which the clocking pulses are generated from circuit 36 is determined by the resistor-capacitor network R1, R2 and C1. If R2 is allowed to increase, via, e.g., a potentiometer, then sinking currents to a grounded discharge (DSCH) input or sourcing currents from VDD to VSS will change more slowly allowing more time between transitions of the voltage state at TRI and THR. As such, a longer clocking cycle will exist at OUT forcing a lower clocking frequency. Decreases in R2 will have a reverse effect causing a higher frequency clocking signal at OUT.

Clocking pulses will be generated at OUT during times in which detector 32 no longer receives external stimuli such as motion, sound, or light waves. Accordingly, when a person is no longer in the room within reasonable proximity to computer load 16, detector 32 drives a relatively low voltage signal to inverter 42 as well as RST inputs of counters 38. As described above, a high voltage at RST bar of circuit 36 causes clocking pulses to be generated at OUT of circuit 36 into the first one of possibly many series-connected counters 38. Counters 38 begins the count process when RST receives a low level signal. Upon receiving, for example, sixteen counts, outputs QA, QB, QC, and QD each produce a high state signal sent to the input of four input nand gate 44a. Corresponding output from four input nand gate 44a is thereby a low level signal. A suitable modulo sixteen ripple counter 38 can be obtained from Texas Instruments, Inc., Dallas, Tex., part no. SN74LS93. Output from nand gate 44a can be sent to a series-connected additional counter 38 to provide further counting capability. For example, if two series-connected modulo sixteen ripple counters 38 are connected as shown, then a low output will be produced from the subsequent connected nand gate 44b after 16×16 or 256 clock pulses or transitions of the clocking signal.

Latching circuit 40 can be configured in many different ways. A suitable configuration includes a pair of two input nand gates 46a and 46b. One input of each nand gate 46a and 46b is cross coupled to the output of the other nand gate as shown. Cross-coupled connection of nand gates 46a and 46b form a reset and set latching circuit. The set input is configured as one input of nand gate 46a, while the other input of nand gate 46a is connected to the output of nand gate 46b. Reset input is configured as one input of nand gate 46b and is coupled to receive the output from nand gate 44b. The output from latching circuit 40 is set when detector 32 transitions to a high state, which then causes gate 46c output to transition to a low state. A low state output from gate 46c will set latch 40 (i.e., gate 46a output goes high and gate 46b output goes low). Thereafter, latching circuit 40 output is reset when it receives a logic low pulse from nand gate 44b. A low output from latching circuit 40, or nand gate 46b, is fed to a switch 48. Upon receiving a low activating input from circuit 40, switch 48 activates or closes the connection between conductive paths 28 and 30 as shown. When latch 40 is reset, gate 46c output transitions to a logic high state, which causes switch 48 to deactivate or open the conductive paths 28 and 30.

Switch 48 includes any switch capable of connecting and disconnecting a conductive path wherein the conductive path can receive either AC power or DC power. A suitable AC power switch includes a triac. A triac is a silicon bidirectional triode thyristor commonly known in the art, and behaves as two inverse parallel connected silicon-controlled rectifiers (SCRs). A suitable triac with power opto-isolator circuit and zero voltage activate circuit (ZVA) 52 can be obtained from Motorola Semiconductor, Inc., part no. MOC2A40-10. A single gate electrode capable of receiving a low output from latching circuit 40 allows the triac to maintain current in both directions along conductive paths 28 and 30 necessary for AC applications. A triac is sometimes called a gated-symmetrical switch such that when, for example, a positive voltage is applied across the conductor main terminals, a corresponding gate voltage will trigger the device into forward conduction. Conversely, a high output from circuit 40 places forward biase voltage across and corresponding current through light emitting diode 50 necessary to open conductor terminals 28 and 30. Some triacs can handle up to 1500 volts, and other are able to handle currents up to 40 amperes. In the present application, triac switch 48 can switch 115 volts AC with as little as 20 mA through diode 50. If the output load is DC, then a power transistor can be used instead of a triac. In such an embodiment, latch 40 output is preferrably coupled to a base of a FET device, and the collector-to-emitter path is connected between terminals 28 and 30.

Figure 3:
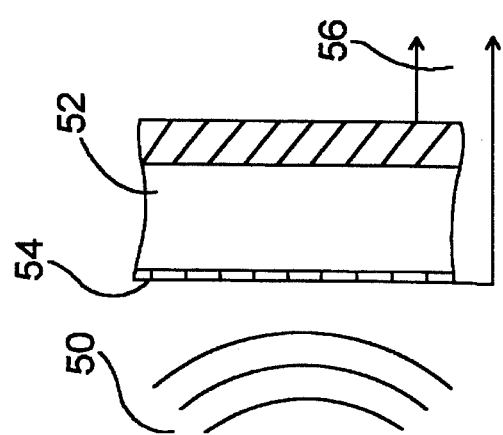

Referring now to FIG. 3, one embodiment of detector 32 is shown. Specifically, detector 32 can receive light, sound, or pressure/vibration waves as would be common in the art. The detector shown in FIG. 3 illustrates one example of a suitable detector which receives remote movement stimuli or possibly sound waves 50 and, upon receiving sound waves 50, crystals 52 (commonly referred to as piezoelectric crystals) generate electric currents when subjected to vibration. Vibration occurs when pressure waves or sound waves strike a thin metallic diaphragm 54. Diaphragm 54 vibrates or modulates causing a piezoelectric effect and forcing electric current between electrodes 56. Piezoelectric crystals include such materials as quartz, Rochelle salts and various ceramics.

Figure 4:
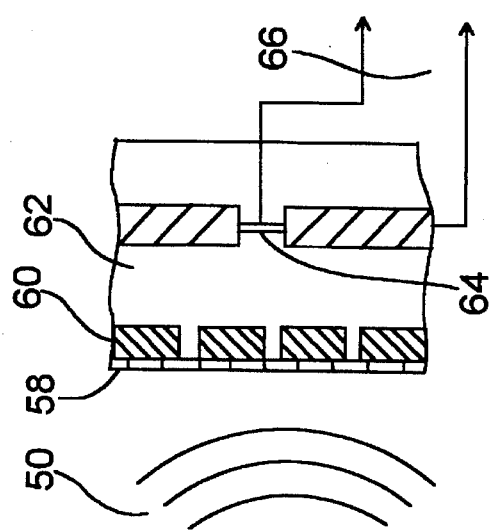

Other transducer forms can be used to receive sound waves or pressure differential waves 50. One such form is shown in FIG. 4. When waves 50 strike diaphragm 58, the thin metal diaphragm vibrates or oscillates between support points 60 causing fluctuations in air volume of receptacle 62. Air volume fluctuations will register upon a flexible membrane or ceramic 64. Mechanical air movement across material 64 produces a corresponding signal across terminals 66. Any change in pressure or air vibration caused by a remote stimuli will therefore be registered by the pressure differential transducer shown in FIG. 4.

Figure 5:
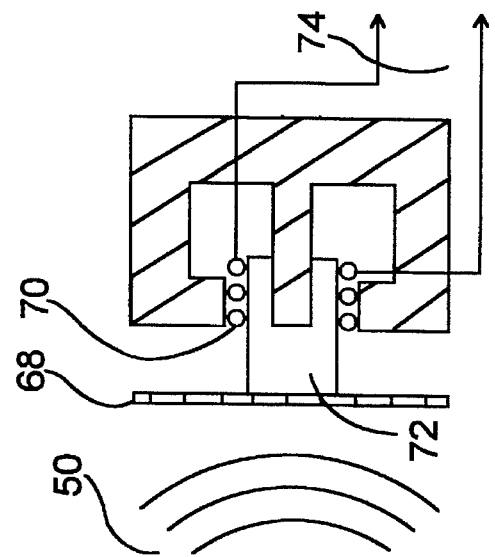
FIGS. 3–5 illustrate alternative embodiments of a detector for sensing a remote activity according to the present invention.

Referring to FIG. 5, an alternative transducer arrangement is shown. Specifically, sound waves or pressure differential waves indicating motion or movement proximate to detector 32 and/or power load 16 is registered upon diaphragm 68. Vibration of diaphragm 68 causes a coil and magnet 70 and 72 to move with respect to each other. The changing magnetic field results in alternative current through the coil. The transducer of FIG. 5 makes use of the electromagnetic effects to produce a resulting current at terminals 74.

It is further appreciated that various optoelectronic circuits can be used to receive light waves throughout the visible and non-visible spectrum and, depending upon the presence of those waves, present an output from detector 32. Specifically, optoelectronic circuit are common in the art and are capable of direct conversion of light to electrical energy. Well known optoelectronic photodetectors include solid state devices such as silicon photodiodes, phototransistors and photoDarlingtons. Various photodetectors can be packaged as discrete devices for through-air or fiber-optic communication systems.

Figure 6:
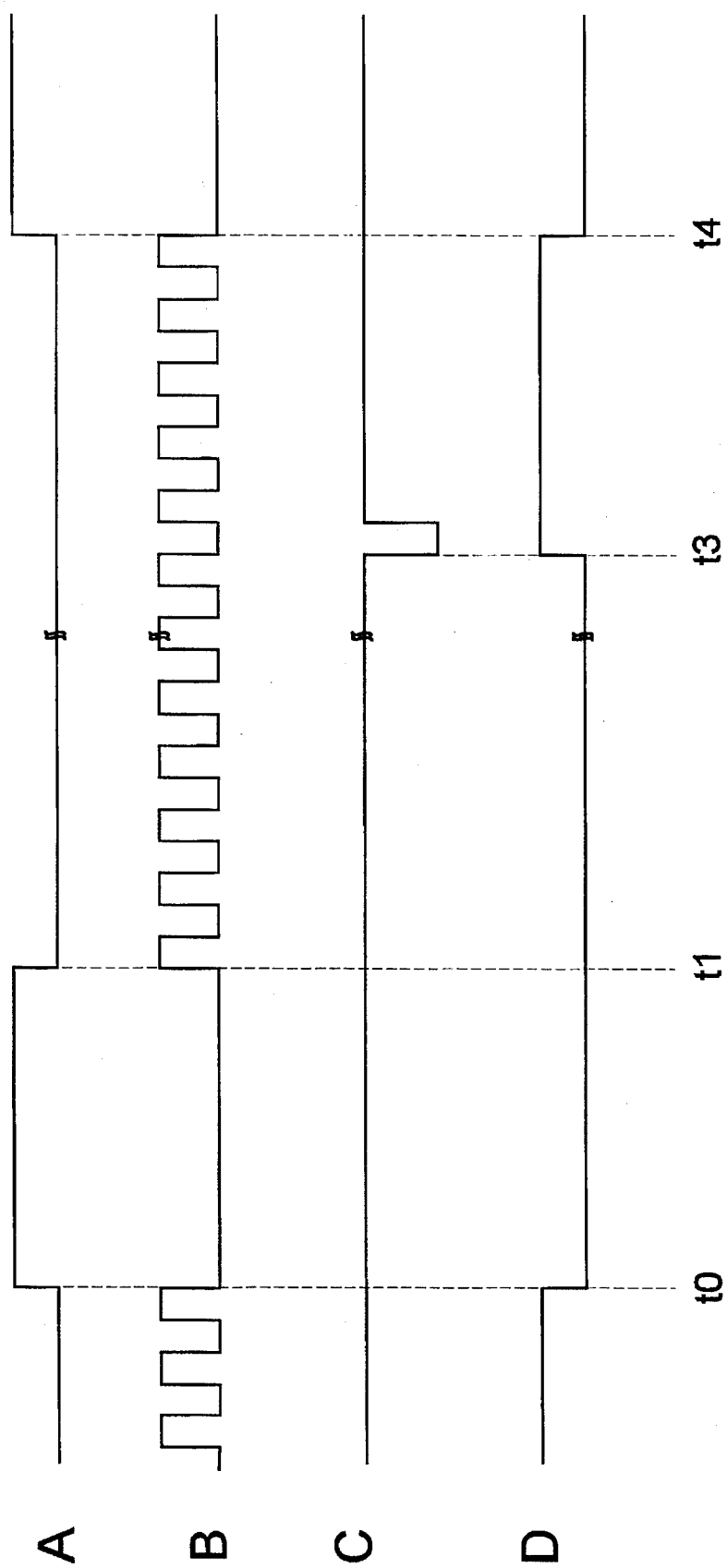
FIG. 6 is a timing diagram which serves to illustrate the operation of the circuit of FIG. 2.

Referring now to FIG. 6, voltage magnitude as a function of time is illustrated for four signals produced at various locations within the circuit of FIG. 2. Signal A is produced at the output of detector 32 as shown in FIG. 2; signal B is produced at the output of clocking circuit 36; signal C is produced at the output of the last serially connected nand gate 44; and, signal D is produced at the output of latching circuit 40. At moment t0 in which detector 32 detects remote activity (i.e., motion, vibration, sound or light signals), it then produces a relatively high signal. At the moment in which detector 32 ceases receiving a sufficient quantity of vibration, sound, or light signals from a remote location, detector 32 produces a relatively low voltage at time t1. Once detector 32 output transitions low, clocking circuit 36 becomes active and clocking pulses are produced at OUT terminal of circuit 36 as shown by signal B at time t1. Clocking signal continues until detector 32 output transitions back to a high voltage value at time t3. It is not until each counter 38 has counted a clock transition representing a maximum count that a low pulse will be generated. Depending upon the number of counters and associated nand gates used, the subsequent or final-connected nand gate output will present a pulse at time t2. The time delay between which a remote activity ceases and when signal C goes low at time t2 represents a delay which can be varied depending upon variable resistor values R2 and R1, variable capacitor value C1, and the number of counters 38 inserted in series. The delay amount is needed in order to ensure that the remote activity is assured and that the inactivity will remain. The delay can be from several minutes to an hour, if needed. After the delay pulse is generated at time t2, the pulse is sent to the reset input of latching circuit 40. A relatively high voltage will then be produced at the output of latching circuit 40 as shown by signal D. The high voltage will remain latched in a steady state until detector 32 senses activity again at time t3. Thus, signal D will remain high during the inactivity period but only after a certain delay has occurred from the initial sensed inactivity. A high voltage value at signal D will cause switch 48 to deactivate conduction path between conductors 28 and 30 thereby turning off power to electronic display 24.

It will be appreciated to those skilled in the art having the benefit of this disclosure that this invention is believed to be capable of applications with numerous types of detectors which are commonly of the non-contact variety. Such detectors include those which sense remote activity by detecting waves emitted from movement, sound, or light of a remote object. Accordingly, any such remote activity detector can be used by the present invention and represents a substantial improvement over the contact-variety detectors. Furthermore, it is also to be understood that the form of the invention shown and described is to be taken as a presently preferred embodiment. Various modifications and changes may be made without departing from the spirit and scope of the invention as set forth in the claims. An exemplary modification might be one which uses numerous serially connected counters or which uses latching circuits other than cross-coupled nand gates. Moreover, it is intended that the following claims be interpreted to embrace all such modifications and changes

What is claimed is:

1. A power interrupt device comprising:
   a detector for sensing an activity remote from said detector and for producing an electrical signal, wherein said electrical signal conveys a first voltage during times in which said activity is present and wherein said electrical signal conveys a second voltage during times in which said activity ceases;
   a clocking circuit configured with an input signal connection for receiving said electrical signal from said detector, and wherein said clocking circuit is further configured for producing a clocking output upon receiving said second voltage of said electrical signal;
   a counter circuit configured with an input signal connection wherein said input signal connection receives said clocking output of said clocking circuit, and wherein said counter circuit produces a pulse after a number of transitions of said clocking output have occurred;
   a latching circuit connected to said counter circuit for latching said pulse at a steady state until said electrical signal conveys said first voltage; and
   a switch having a conductive path wherein said conductive path is disconnected during times in which said pulse is latched at a steady state and wherein said conductive path is connected during times in which said pulse is not latched at a steady state.

2. The power interrupt device as recited in claim 1, wherein said detector comprises an optical detector for sensing a light source.

3. The power interrupt device as recited in claim 1, wherein said detector comprises a sound detector for sensing a sound wave.

4. The power interrupt device as recited in claim 1, wherein said detector comprises a motion detector for sensing a pressure differential.

5. The power interrupt device as recited in claim 1, wherein said counter circuit comprises:
   at least one modulo sixteen ripple counter having four outputs; and
   a four input nand gate coupled to receive said four outputs.

6. The power interrupt device as recited in claim 1, wherein said clocking circuit comprises a variable resistor coupled to a capacitor, wherein change in said variable resistor causes a resulting change in the frequency of said clocking output.

7. The power interrupt device as recited in claim 1, wherein said latching circuit comprises a flip flop having a set input and a reset input, said set input is coupled to receive said pulse from said counter circuit and said reset input is coupled to receive said electrical signal from said detector.

8. The power interrupt device as recited in claim 7, wherein said flip flop comprises two nand gates, each nand gate having two inputs wherein one input of one nand gate is connected to the output of the other nand gate.

9. The power interrupt device as recited in claim 1, wherein said switch comprises a triac.

10. A power interrupt device comprising:

a detector connected between a power source and a power load, said detector is fixed proximate to said load and comprises a transducer for sensing an activity remote from said detector and said load;

an electrical signal produced from said detector wherein said electrical signal conveys a first voltage during times in which said activity is present and wherein said electrical signal conveys a second voltage during times in which said activity ceases and said detector is in use;

a plurality of clocking pulses produced from a clocking circuit connected to the detector, said clocking pulses can be produced at variable frequency during times in which said electrical signal conveys said second voltage;

at least one delay pulse produced from a counter circuit connected to the clocking circuit after a number of clocking transitions of said clocking pulses have occurred, said delay pulse is of a time duration substantially equal to one of said clocking pulses;

a latched signal produced from a latching circuit having a reset input and a set input, wherein the reset input is connected to receive the electrical signal and the set input is connected to receive the delay pulse; and a switch having a conductive path coupled between said power source and said power load, said switch is configured to receive said latched signal and, upon receiving the set state of said latched signal, said switch is configured to disconnect said conductive path, and said switch is further configured to receive said latched signal in a reset state and, upon receiving said reset state said switch is configured to connect said conductive path.

11. The power interrupt device as recited in claim 10, wherein said detector comprises an optical detector for sensing a light source.

12. The power interrupt device as recited in claim 10, wherein said detector comprises a sound detector for sensing a sound wave.

13. The power interrupt device as recited in claim 10, wherein said detector comprises a motion detector for sensing a pressure differential.

14. The power interrupt device as recited in claim 10, wherein said counter circuit comprises:

at least one modulo sixteen ripple counter having four outputs; and a four input nand gate coupled to receive said four outputs.

15. The power interrupt device as recited in claim 10, wherein said clocking circuit comprises a variable resistor coupled to a capacitor, wherein change in said variable resistor causes a resulting change in the frequency of said clocking pulses.

16. The power interrupt device as recited in claim 10, wherein said latching circuit comprises a flip flop having a set input and a reset input, said set input is coupled to receive said delay pulse from said counter circuit and said reset input is coupled to receive said electrical signal from said detector.

17. The power interrupt device as recited in claim 16, wherein said flip flop comprises two nand gates, each nand gate having two inputs wherein one input of one nand gate is connected to the output of the other nand gate.

18. The power interrupt device as recited in claim 10, wherein said switch comprises a triac.

19. A power controller for an electronic display comprising:

a power source;

an electronic display having a power input;

a power interrupt device retrofitted between said power source and said power input, said power interrupt device comprises:

a detector for sensing an activity remote from said electronic display and for producing an electrical signal during times in which said activity ceases;

a clocking circuit connected to said detector and adapted to produce a clocking output signal upon receiving said electrical signal;

a counter circuit connected to said clocking circuit and adapted to produce a delay pulse after a number of transitions of said clocking output signal have occurred;

a latching circuit connected to said counter circuit for latching said pulse at a steady state until said electrical signal ceases; and a switch having a conductive path configured between said power source and said electronic display wherein said path is disconnected during times in which said pulse is latched at a steady state.

20. The power controller as recited in claim 19, further comprising means for varying the frequency of said clocking output signal.

* * * * *